March 11, 1941.  W. S. RENDALL  2,234,605
METHOD AND APPARATUS FOR MAKING GLASS
Filed Nov. 13, 1936  3 Sheets-Sheet 1

Inventor
William Stanley Rendall
By Cushman Darby & Cushman
Attorneys

March 11, 1941.  W. S. RENDALL  2,234,605
METHOD AND APPARATUS FOR MAKING GLASS
Filed Nov. 13, 1936  3 Sheets-Sheet 2

Inventor
William Stanley Rendall.
By Cushman Darby + Cushman
Attorneys

March 11, 1941. W. S. RENDALL 2,234,605
METHOD AND APPARATUS FOR MAKING GLASS
Filed Nov. 13, 1936 3 Sheets-Sheet 3
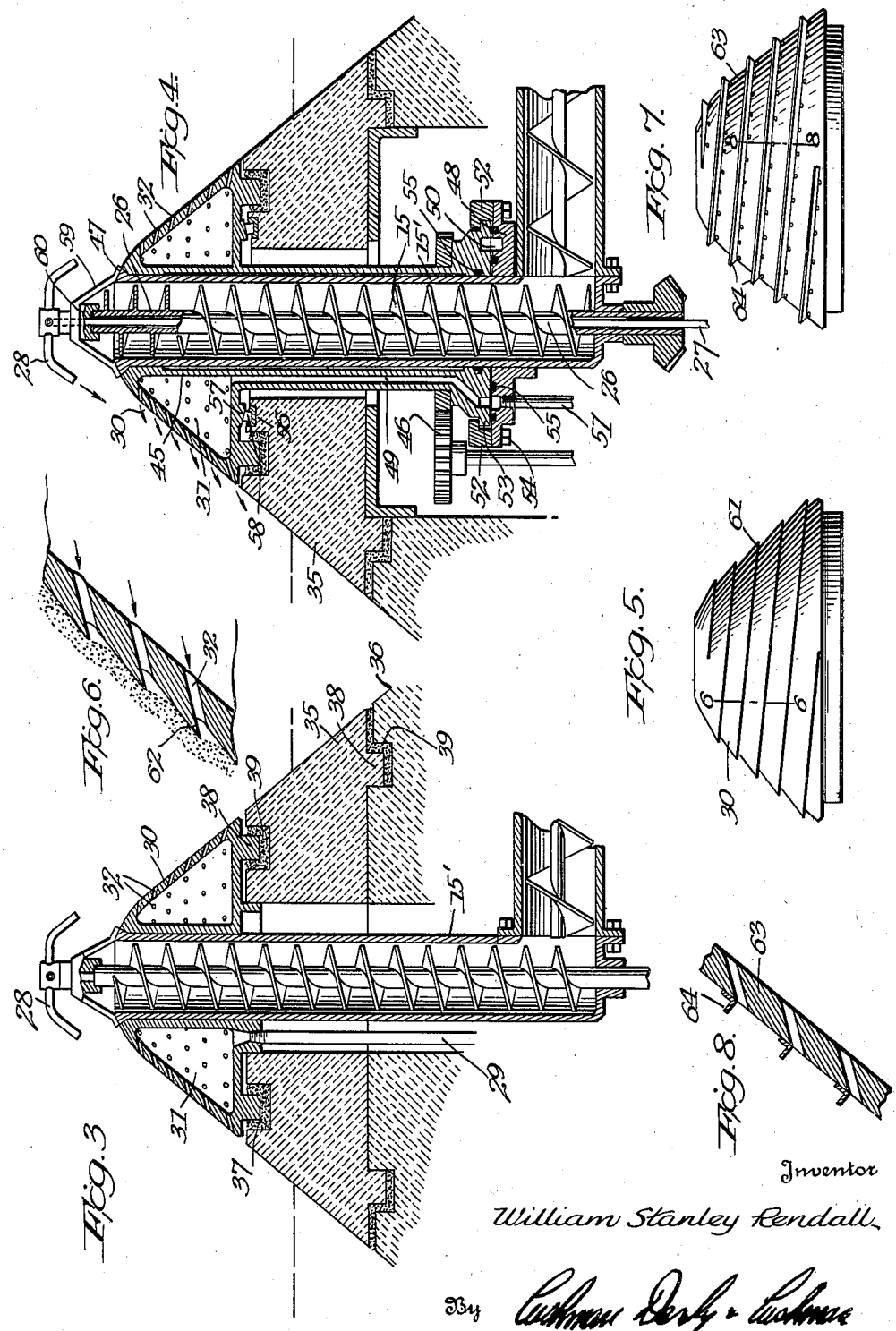
Inventor
William Stanley Rendall
By Cushman Derby & Cushman
Attorneys

UNITED STATES PATENT OFFICE 2,234,605

METHOD AND APPARATUS FOR MAKING GLASS

William Stanley Rendall, Baltimore, Md., assignor to Crown Cork & Seal Company, Inc., Baltimore, Md., a corporation of New York Application November 13, 1936, Serial No. 110,736

1 Claim. (Cl. 106—36.1)

The present invention relates to an improved method and apparatus for making glass which may be employed in the manufacture of bottles and other containers, sheets, and various glass articles.

It is an object of the invention to provide a method whereby the economies resulting from the use of rock salt or sodium chloride as an ingredient of the glass mixture may be taken advantage of to produce a high quality glass. Up to the present time, the glass industry uses the relatively expensive soda ash or sodium carbonate for the reason that no satisfactory method has been devised by which the less costly sodium chloride can be utilized. The difference in cost of these raw materials is substantial and the industry has long sought an available method whereby sodium chloride can be used in a commercially feasible plant.

I have discovered a very simple method of operation in which (1) reaction of the ingredients for glass making takes place and the reacted mass either (2) refined into glass or (3) reduced to a frit, ground, and then converted into glass. These methods are economically acceptable for all practical reasons and in addition a high quality homogeneous glass is obtained. A byproduct resulting from the reaction of the ingredients is also obtained.

An important feature of the invention resides in accomplishing the reaction of the ingredients of the glass in a heating chamber with exclusion of products of combustion. That is to say, in an oil or gas fired furnace, opportunity for contamination of the reaction byproduct or product is effectively prevented. This result is achieved by conducting the reaction between the glass ingredients at the desired temperature, by conduction and radiation, as distinguished from direct firing.

Another feature of the invention consists in carrying out the reaction under conditions to maintain the temperature substantially constant. This result is likewise obtained through heating by radiation and conduction and also by excluding the reaction zone from any detrimental effects produced, for example, by its proximity to either products of combustion or to the highly heated, previously reacted batch, whether in solid, molten or semi-molten state.

I have particularly in mind a glass produced by the reaction of sand, sodium chloride, calcium carbonate and steam. In order to thoroughly promote this reaction, I have discovered that the solid particles must be in a granular form of relatively small mesh size and intimately mixed. Further, I have discovered that the reaction with the steam is carried out best when the solid materials are in the form of a relatively thin layer and, to this end, I produce such a layer and continuously treat the same with steam presented to the layer from one or opposite sides and while the layer is in continuous motion through the reaction zone. In this manner, not only is a speedy reaction accomplished, but, of equal importance, a complete reaction, so that the desired silicates of calcium and sodium are formed, as well as complex or poly-silicates.

In order to achieve the above result, the mixture is continuously fed to and through the reaction zone in a controlled manner as to both speed of feed and quantity of feed. In some cases, I preheat the ingredients of the mixture while they are being moved to the reaction zone. This hastens reaction, and since in the movement of the ingredients of the mixture to the reaction zone, they are thoroughly mixed in their finely divided state, the charge is delivered at optimum, potentially reactive conditions.

The reaction zone which forms a very desirable feature of this invention is preferably in the form of a conical or inclined surface to which the preferably preheated and intimately mixed solid ingredients are continuously fed. Where a cone is used, the ingredients are fed to the apex of the cone and a thin layer is formed thereabout. Where an inclined surface is used, the ingredients are fed to substantially the top thereof. In each instance, the thin layer of ingredients is permitted to move downwardly, while undergoing reaction, and in this connection, the speed of movement is such that at the temperature prevailing, complete reaction will take place. Moreover, this speed of movement downwardly on the conical or inclined surface is controlled by the feed and/or by feeding means associated with the reaction chamber, so as to reduce the possibility of the carrying down of uncombined sodium chloride.

During the reaction, as previously stated, steam is discharged upon, into and through the thin layer of the solid ingredients in their highly and intimately mixed state and, while the layer is continuously moving at the predetermined speed. The steam is introduced in such a manner so as to provide substantially an atmosphere enclosing the reactive mass and under the temperature conditions prevailing will assure intimate, complete and rapid reaction.

As heretofore stated, the reaction zone is substantially segregated from products of combustion or other contaminating influences, as well as high temperature conditions such as might be impressed upon the charge through proximity or direct exposure to a high temperature molten bath of the reacted mass. In addition, this segregation enables the hydrogen chloride gas developed by the reaction to be efficiently removed and recovered and adds an additional economy to the operation, in that either the acid, or free chlorine, is obtained as a commercially usable by-product.

The reacted mass as it leaves the reaction zone is usually plastic, i. e., molten or semi-molten. Immediately the reacted mass passes from the reaction zone, it may be subjected to several operations. For example, (1) the reacted mass is introduced to a high temperature bath (2400° F.) of the previously reacted material and in that manner is rendered fluid, (2) the reacted mass may be immediately and continuously cooled from its plastic state to the form of a frit, (3) the reacted mass may be subjected to an elevated temperature to increase its plasticity or fluidity and (4) the reacted mass, if sufficiently plastic or after having its plasticity increased, is suitably molded into bricks, blocks and, in fact, any desired form to produce a vitreous article possessing, by reason of its porosity, useful properties as an acoustic or insulation material.

Where the reacted mass is caused to assume a fluid state by introduction into a molten bath of the previously reacted material, the contents of the bath are continuously drawn off and cooled, in which state the product has a substantially vitreous or frit-like character. Instead of cooling be availed of in a manner to allow it to be molded the bath, however, its plasticity and fluidity may as above described.

Also, the reacted mass in molten or semi-molten condition as it leaves the reaction chamber, is immediately cooled to a substantially vitreous or frit-like state.

The vitreous, frit product, either as cooled and solidified from the molten bath or as cooled directly from the reaction chamber, is suitably ground to such a fineness as will promote homogenization. This ground frit is thereafter treated in the ordinary glass furnace to produce a refined product constituting a high quality homogenized glass.

It is an additional feature of the invention that the reacted mass after being transformed into a molten bath, is continuously or intermittently heated in a glass furnace to form complete glass. The heating chamber for preparing and holding the bath is preferably in direct communication with the glass furnace which may form a part thereof. The glass furnace is equipped with forming means so that bottles, sheets and a wide variety of glass articles are directly produced.

Where the plasticity of the reacted mass is availed of, either from the bath or directly from the reaction chamber with or without additional heating or some further cooling to increase or decrease plasticity for making molded products, as before mentioned, the mass is possessed of numerous pores, bubbles, voids and is generally in an unrefined but plastic condition. This product when molded retains the cells, voids and bubble-like imperfections, so that it is relatively porous and the molded product has, therefore, excellent acoustic and insulation qualities.

The term "reacted mass" in this specification is intended to mean the reaction product of the ingredients, in a plastic, or molten or semi-molten state. The expression "frit" is employed to cover the cooled and solidified reacted mass either from a liquid state or directly from the reacted plastic condition. "Glass" as used means the final refined or complete glass produced by heating the reacted mass, the frit, or a bath of the reacted mass.

The apparatus for carrying out the method of the present invention may, as will be appreciated, take many forms and I have therefore in the drawings illustrated several preferred embodiments which, however, must be understood as being purely illustrative.

Referring to the drawings—

Figure 3 is an enlarged cross-sectional view of the conical reaction table.

Figure 4 is a sectional view of a modified form of reaction table.

Figure 5 is an elevational view of a further form of reaction table.

Figure 6 is an enlarged cross-sectional view on the line 6—6 of Figure 5.

Figure 7 is an elevation of a further modification of reaction table.

Figure 8 is a section on the line 8—8 of Figure 7, and

The ingredients of the batch

The invention will be described for the manufacture of glass from a typical mixture of ingredients including sodium chloride, calcium carbonate and sand, which are reacted in the presence of steam. It is to be understood, however, that various types of glass mixtures may be similarly treated in accordance with the method and apparatus of this invention and that the invention is, therefore, not limited to the ingredients just recited. Additional ingredients such as feldspar or borax may be added to the mixture for specific purposes, and, in fact innumerable other ingredients may be employed for their recognized purposes in the glass industry.

A batch for purposes of illustrating this invention consists of sand (99.8%) 74 pounds, rock salt (97.0% sodium chloride) 31 pounds, and raw lime (98.0% calcium carbonate) 18 pounds.

Apparatus

Figure 1:
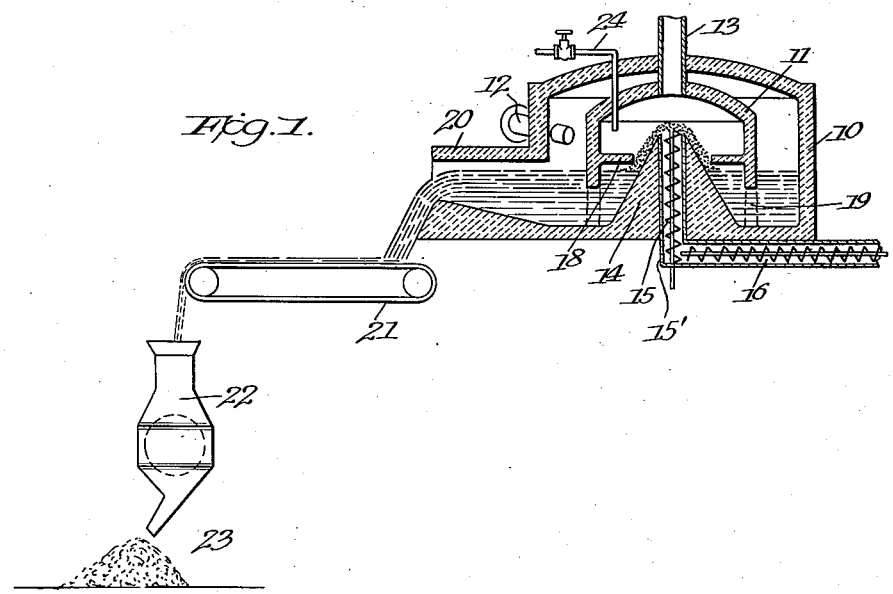
Figure 1 is a diagrammatic view illustrating one method of carrying out the invention.

Referring to Figure 1, the numeral 10 indicates a suitable furnace within which is disposed a chamber 11. This chamber is substantially circular and is centrally disposed with respect to the furnace 10. Positioned so as to extend through the wall of the furnace 10 are a plurality of burners or heating units 12, which may be gas flames or oil flames, and these are directed downwardly and angularly with respect to the wall of the furnace 10, so that the flames are projected tangentially to as distinguished from being directly played upon the wall of the chamber 11. The chamber 11 at its top is provided with a stack or outlet 13 and on its base which is the bottom of the furnace 10 there is disposed a conical table 14. The table 14 is provided throughout its length with an opening in which is disposed a feeding screw 15. The batch ingredients are supplied to this screw through the conveyor trough 16. Extending inwardly from the wall of chamber 11 is a ring-like baffle member 18, the inner diameter of which may be, in some cases, adjustable so as to control the space between the ring and the adjacent conical wall of the table 14. Adjacent its bottom, the wall of the chamber 11 is provided with a plurality of openings 19 which communicate with the bottom of the furnace 10 and, at one end, the furnace is provided with a suitable outlet 20. Associated with the outlet 20 is a conveyor 21 of any suitable type discharging into a crusher 22 of conventional design and material crushed therein is discharged upon a suitable table or conveyor 23. Communicating with the chamber 11 is a steam outlet 24 and as many thereof may be employed as desired.

The apparatus described in connection with Figure 1 is representative of the preferred type of apparatus utilized for carrying out the present invention, but I have developed modifications thereof which substantially enhance the efficiency of the method.

Figure 2:
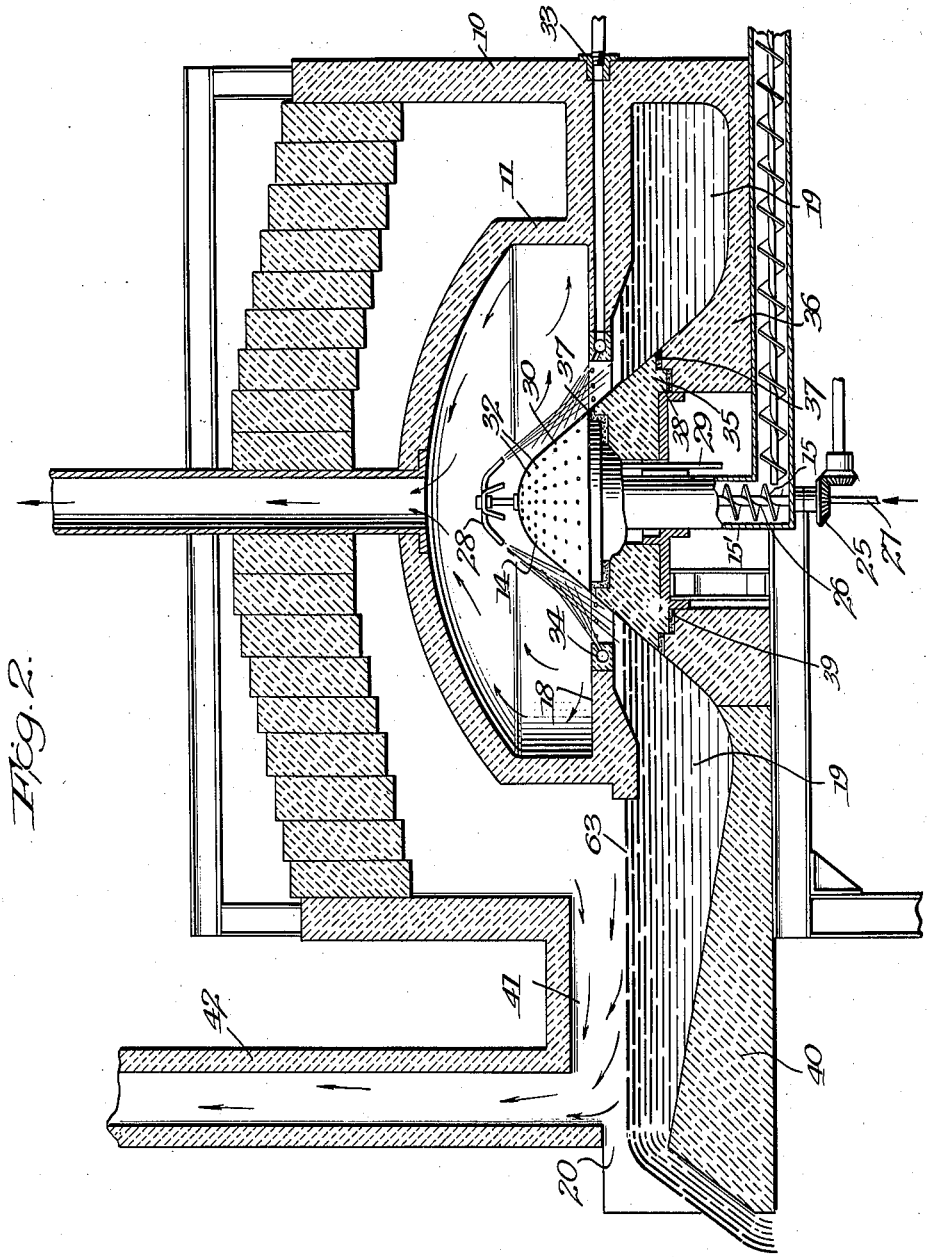
Figure 2 is a cross-sectional view through the furnace in which the reaction takes place.

Referring to Figure 2, the feed screw 15 is rotated in a tube 15' through the medium of gearing 25. Within the shaft 26 of the feed screw is disposed a steam supply pipe 27. Steam is discharged at the top of the conical table 14 through the medium of a plurality of downwardly directed nozzles 28 whose direction is parallel to the surface of the cone, or the steam may be positively directed on the layer carried by the cone. Also, and referring to Figure 3, steam is introduced by pipe 29 within the apex portion 30 of the conical table which is hollowed out, as shown, and forms in effect a steam chest 31. The apex portion 30, as shown in Figure 3, for example, is provided with a multiplicity of perforations 32, so that steam is directed both externally and internally upon any material resting upon the apex member. In addition, a steam line 33 is provided extending through the ring member 18 and communicating with a multiplicity of upwardly directed outlets 34 in the ring member. In this manner, steam is directed downwardly and upwardly, as well as outwardly upon any material disposed upon the apex member and presents substantially an atmosphere of steam. The steam is preferably of such pressure that it will not force any material off of the perforated or grid-like apex member. The perforations 32 are directed downwardly, as shown in Figure 3 and Figure 6, so that the loose material cannot find its way into the steam chest.

The apex member 30 is detachably supported upon an intermediate conical member 35 which, in turn, is detachably supported upon a conical extension 36 separable from or integral with the base of the furnace. Between the several sections 30, 35 and 36 forming the conical table, there is provided a suitable seal and insulator, for example, said indicated generally at 37 and it is to be noted that the several sections are joined by an interfitting relation, that is, the section 30 has a projection 38 fitting in the insulated groove 39 in the intermediate section 35 and the sections 35 and 36 are similarly constructed.

It is to be noted that the ring member 18 terminates substantially at the joint between the apex member 30 and the intermediate supporting section 35 of the conical table. The area of the conical table between the apex thereof and the ring member 18 constitutes the reaction zone of the apparatus and the proximity of the inner edge of the ring member and the wall of the conical member is controlled, so that when a layer of material is on the conical table and moving downwardly thereover, it cooperates with the ring member to substantially segregate or exclude the reaction zone from the remainder of the apparatus.

Referring to Figure 2, the furnace is extended, as shown at 40, to provide the outlet 20 and the basin formed by the extension communicates with the openings 19 in the bottom wall of the chamber 11. In one form of the invention, a molten mass of the reacted material is disposed in the furnace below the ring member 18 and above the level of the openings 19 in the bottom of the chamber 11, so that this bath will further act as a seal to prevent the entrance of contaminating influences. The products of combustion pass through the conduit 41 above the level of the molten bath to the stack 42 where they are withdrawn, while the molten metal overflows through the outlet 20 to the conveyor 21.

As a further modification of the construction, it is sometimes desirable to rotate the apex member 30 and referring to Figure 4, I have illustrated the apex member as provided with an integral, downwardly extending sleeve 45. This sleeve is adapted to be rotated about the tube 15' by means of gearing 46. At its upper end, the tube 15' is enlarged as at 47 to form an upper bearing, while at the lower end thereof there is fixed a plate member 48 forming the lower bearing. The sleeve 45 is provided with a plurality of spaced openings 49 opening at the top into steam chest 31 and at the bottom into the enlarged end of the sleeve in communicating relation with a circular groove 50 formed in the plate 48. Communicating with the groove is a steam line 51. Steam from the line 51 supplies the groove 50 and this, in turn, supplies the openings 49 in the sleeve 45 with steam for introduction into the steam chest 31. The enlarged end of the lower end of the sleeve is firmly secured to the plate 48 by means of a ring 52, which engages a flange 53 on the base of the sleeve and is bolted or drawn upon the plate 48 and the flange 53 by means of the bolts 54. A suitable packing 55 is interposed between the plate 48 and the bottom surface of the enlarged end of the sleeve to form a steam seal and a similar gasket 55 is disposed between the sleeve and the adjacent wall of the tube 15'. In order that the apex member 30 may be easily rotated, I preferably provide suitable bearing surfaces 56 and 57 between the bottom of the apex member and the adjacent upper surface of the intermediate member 35 and interpose suitable roller bearings 58 between the surfaces. In this construction, the steam line 27 extends up through the shaft 26 of the feed screw to preheat the mixture, and through a spider 59 supported upon the enlarged bearing end 47 of the tube 15'. This spider carries a distributing head 60 for the steam nozzles 28. The purpose of providing a rotary apex member is to afford, in some cases, a more even distribution of material discharged in the upper end of the feed screw 15 as a layer upon the conical table. As stated the mixture travelling upwardly to the apex of the table may be suitably heated by the line 27.

Another means of affording the proper distribution of the material, is illustrated in Figures 5 and 6 where the apex member 30 is provided with a spirally formed surface 61. As shown in Figure 6, the spirals project slightly beyond the ends of the downwardly directed openings or perforations 32. The purpose of this is to control the feed of the material by providing a series of retarding obstructions indicated at 62 which are effective when the apex member is not rotated, but are particularly useful where the apex member is rotated and in a direction contrary to the direction in which the spiral is formed. That is, the spiral construction will afford a means of retarding and hence controlling the downward flow of the reaction ingredients, so that, for some purposes, the reaction may be suitably prolonged.

In Figures 7 and 8, the apex member 63 is provided with a spiral vane 64 so that when the member is rotated clockwise, the mixture being reacted is fed downwardly at a controlled rate to assure proper reaction as well as distributed as a layer and subjected to agitation.

Figure 9:
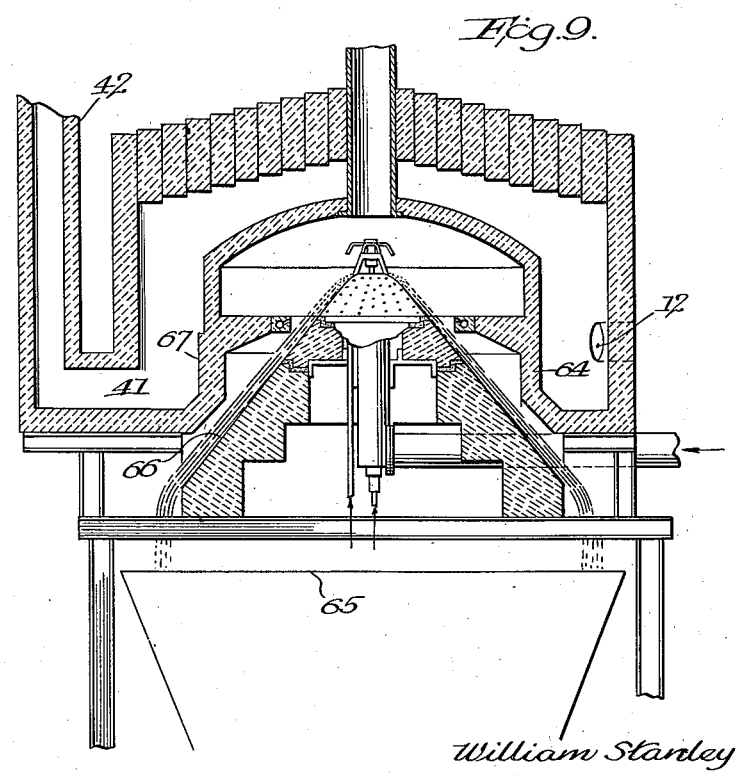
Figure 9 is a sectional view of a modified form of reaction furnace.

In Figure 9, the reacted materials pass directly from the conical table to a suitable hopper 65, the table being extended to form a chute 66 and allow free and uninterrupted drop of the reacted materials into the hopper. In other respects, the apparatus is similar to that shown and described in connection with the other views of the drawings and susceptible to similar modification. It is to be noted that the reaction zone and chute are segregated from products of combustion so that contamination of the reacted mass is avoided.

While I have shown the mixture as moving downwardly through the reaction zone, it may be reacted while traveling in a horizontal plane or even upwardly. The continuous downward movement as shown is preferred.

Also while I have described means for feeding the mixture upwardly through the cone and distributing the mixture at the apex thereof, a suitable chute, tube or trough may be provided extending through the top of the furnace 10 and heating chamber 11 or through the side walls thereof, and delivering metered quantities of the mixture to the apex of the cone 30 for continuously forming and presenting a suitable layer of the mixture to be reacted.

*The method*

Broadly, and referring to Figure 1, the solid constituents of the batch are fed through the trough 16 and the opening 15 or tube 15' at a controlled speed and in a controlled quantity, so that upon being ejected at the apex of the conical table, they spread out and form as a thin layer thereon. At the same time, steam is introduced and a temperature is maintained within the reaction zone of about 1500° F. This is representative for the batch above mentioned and is subject to variation up or down, as the case may be, dependent upon the constituents and their percentage relation in the batch. The reaction zone is described by the upper surface of the ring member and the surface portion of the conical table extending thereabove, in association with the upper part of the chamber 11 defined by the ring member and the top of the chamber. The material will move down the conical surface and the speed of its downward motion is controlled by the speed of the feed in the tube 15' and also by such means as the rotatable apex member, and the spirally formed or vaned apex members, heretofore described. Preferably, conditions are so maintained that the reaction between the solid constituents and the steam is complete and no free sodium chloride is carried with the reacted mass past or below the ring member 18.

The reaction results in the formation of a reacted mass containing calcium silicate and sodium silicate, together with complex or poly-silicates and free silica. The plasticity or liquidity of the reacted mass will be governed by the temperatures and the speed of feed, i. e., the time period allowed for reaction, but usually the reacted mass is plastic i. e., molten or semi-molten at the conclusion of the reaction. In this state, of course, it is possessed of innumerable pores, holes, voids and cells. It is to be noted that the reaction is carried out with exclusion of products of combustion from the burners 12 by reason of the ring member 18, which is disposed in close proximity to the wall of the conical member, so that the layer of material forms a seal against such contaminating influences and this seal is also aided by the bath level as shown in Figure 2 or the construction shown in Figure 9. The distance between the inner diameter of the ring member and the wall of the conical table may be adjustable as heretofore described and may be used in some cases to regulate the thickness of the layer formed upon the conical table.

During the reaction hydrogen chloride gas is formed and since the chamber 11 is free of contaminating influences, this hydrogen chloride is recovered through the stack 13 in substantially pure state and constitutes a valuable by-product.

Referring to Figures 1 and 2, the mixture is continuously discharged upon the apex member and continuously moves down the surface thereof, while being subject to the desired conditions of reaction.

It will be noted that the relatively thin layer disposed upon the surface of the apex member is subjected to an atmosphere of steam provided by the outlets 28, 32 and 34. Since the layer is relatively thin and the steam is supplied thereto upon both sides, a very complete and speedy reaction is afforded. The solid ingredients of the batch are finely divided, assuring an intimate reactive relation between them; the introduction of the steam throughout the relatively thin layer assures that the reaction will be completed under the predetermined conditions of speed of feed of the mixture, relative inclination of the conical table, or such feeding means as the rotatable apex member with or without a spiral surface or a vaned surface, by the time the reacted mass reaches the ring 18.

Referring to Figures 1 and 2, after the mass passes the ring 18, it encounters the bath 63 carried in the bottom of the furnace and which overflows from the basin 40. This bath initially is made by melting glass, but as the reaction progresses, it becomes a bath of the reacted materials. The temperature of this bath is considerably elevated, in the present instance, being at a temperature of about 2300° F.–2400° F. or high enough to maintain the reacted material molten. Upon introduction of the reacted material from the conical table to the bath, the reacted material assumes the molten state and will overflow from the outlet 20. It is to be noted that the level of the molten bath extends above the top of the openings 19 in the bottom wall of chamber 11, so as to form a thorough seal against the entrance of combustion gases or other contaminating influences into the reaction zone.

The molten reacted material issuing from the outlet 20 is received upon the conveyor 21, where it is cooled to a frit and fed to the crusher 22. In this crusher, the frit is finely ground or subdivided and mixed. This finely divided mixture is now ready to be converted into complete glass simply by introduction to a glass melting furnace and heated to a temperature of about 2700° F. By reason of the cooling and crushing step accompanied by a mixing of the crushed frit, I am enabled to obtain a high quality homogenized glass.

The melting furnace may be equipped with means for forming bottles and other containers, sheets and a variety of glass articles.

Moreover, the furnace 10 may be connected integrally with or otherwise communicate with the melting furnace, so that the molten reacted mass may be continuously or intermittently fed to the melting furnace, and there refined into glass and formed into glass articles preferably as a continuous operation.

I have generally described the method employed by me for the manufacture of glass, utilizing sodium chloride instead of sodium carbonate. The use of sodium chloride assures a substantial economy in the cost of raw materials and the method herein set forth being devoid of any complicated procedure or apparatus is conducted at so low a cost as to be thoroughly commercially feasible. It is this discovery which I have made in both method and apparatus that assures the production of a high quality glass at a substantial reduction in operating costs.

The construction illustrated in Figures 4, 5 and 7, namely the use of a rotary apex member, a spirally formed or a spirally vaned apex member or a spirally formed or spirally vaned rotatable apex member enables the distribution of the layer of material upon the apex member and its flow to be controlled for certain purposes and is highly efficient in the production of the high quality product of this invention. For example, the rotary apex member will assure a very even distribution, as well as afford some agitation of the constituents to promote their complete reaction and control the rate of downward flow. The spiral or spiral vaned apex members likewise assure an intimate relation between the solid ingredients and their reaction with the steam and each other and, as explained above, will control the continuous downward movement of the layer.

Referring to Figure 9, the reacted mass as discharged past the ring member 18, is immediately and directly cooled to a solid frit. This frit in its cooled state is recovered from the hopper 65 and suitably ground and then converted to complete glass, as previously described.

In certain cases, as where I desire to produce an acoustic or insulating material, the molten material issuing from the opening 20 is molded in the form of bricks or slabs. If desired, the plasticity of the bath may be changed for the particular molding operation. The reacted mass as it issues from the opening 20, is in unrefined state and, therefore, contains enumerable bubbles, holes, voids and similar imperfections. These, of course, are present in the molded article and afford the desired acoustic and insulating properties. If desired, the cooled frit from the conveyor 21 may be remelted and then molded, providing, of course, that the melting does not so refine the glass as to render it devoid of the required number of pores.

Such insulating or acoustic products may be obtained also by immediately molding the relatively plastic mass issuing from the reaction chamber past the ring member 18. For example, in accordance with the method shown in Figure 9. If the reacted mass does not have the required plasticity as it passes under the ring member 18, I can direct burners upon the lower wall 67 of the heating chamber, so as to obtain any desired plasticity and the plastic mass may then be immediately molded. This product, likewise in the form of bricks or slabs, is useful for acoustic or insulating purposes, and is characterized by enumerable pores, openings and holes.

In connection with the various apparatus illustrated and described, it is to be understood that they are constructed of suitable heat resisting material, either metal or argillaceous compounds and that the heating chamber 11 is suitably lined to be resistant to the hydrochloric acid gas, as well as high temperatures. The conical table likewise is resistant to both high temperatures and chemical action of the reaction constituents and the reaction products.

While I have described the present invention as concerned with the manufacture of glass, it is to be understood that the process and apparatus here disclosed is equally applicable to the manufacture of sodium silicate from sodium chloride, sand and steam. In carrying out this process the temperature of the heating chamber is maintained at about 950 to 1600° F. to insure reaction of the silica with the sodium and the production of hydrochloric acid gas. The proportions of ingredients will be, of course, worked out in the usual manner to produce a complete reaction and the sodium silicate flows down the conical table, for example, either to the bath, or into a hopper as shown in Figure 9.

I produce from the frit prepared in accordance with this invention, a further type of molded product wherein the ground frit is placed in a mold and heated at a temperature just sufficient to melt the surface. Thus in the case of a brick, there will be formed a product having a smooth or roughened continuous outer surface and a porous interior composed of the granules of the frit in their original state. For producing this type of product, the molds may be carried on a conveyor, and the frit subjected to a temperature of about 1500° to 2000° for a brief period to form the surface skin, whereupon the product is then suitably annealed in the mold, and discharged from the conveyor. In some cases the product is removed from the mold before annealing.

In order to avoid shrinkage of the product, it is in some cases desirable to spin or rotate the mold whereby, due to centrifugal force, the resultant product will undergo no substantial change in its outer dimensions while interiorly, there will be a hollow core.

While I refer to the frit of the present invention as useful in manufacturing this type of article, it is to be understood that glass from any source may be ground and similarly molded and treated to produce the same product. Thus ordinary glass cullet is ground and placed in a mold and the material subjected to a heating such as will form the surface skin, annealed within or without the mold. The mold may or may not be spun as required.

Another product consists in spraying the ground frit or ground glass from any source with sodium silicate in its adhesive state and thereafter pressing, molding or otherwise forming the coated ground frit or glass into articles of any desired shape with suitable hardening of the binder. Such articles, of course, may be formed with a surface skin in the manner heretofore disclosed if desired.

I claim:

The method of making glass comprising mixing sand, sodium chloride and calcium carbonate, continuously feeding the mixture to a closed reaction zone of a furnace, reacting the mixture in an atmosphere of steam and at an elevated temperature while it is traveling as a thin film through said zone, forming a substantially completely reacted mass composed of sand, silicates of sodium and calcium and complex or polysilicates in molten or semi-molten state, continuously collecting the reacted mass as formed, and cooling the same to a frit capable of being converted to glass by heating.

WILLIAM STANLEY RENDALL.